(12) United States Patent
Komulainen et al.

(10) Patent No.: US 11,057,894 B2
(45) Date of Patent: Jul. 6, 2021

(54) APPARATUS, METHOD AND COMPUTER PROGRAM FOR NON-STAND-ALONE WIRELESS COMMUNICATIONS

(71) Applicant: Nokia Solutions and Networks Oy, Espoo (FI)

(72) Inventors: Mikko Komulainen, Oulu (FI); Hannu Pirila, Littoinen (FI); Juha Hallivuori, Tampere (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/505,820

(22) Filed: Jul. 9, 2019

(65) Prior Publication Data
US 2020/0022128 A1 Jan. 16, 2020

(30) Foreign Application Priority Data

Jul. 16, 2018 (EP) .................................. 18183773

(51) Int. Cl.
*H04W 88/06* (2009.01)
*H04W 72/04* (2009.01)
*H04W 76/15* (2018.01)

(52) U.S. Cl.
CPC ....... *H04W 72/048* (2013.01); *H04W 72/046* (2013.01); *H04W 72/0453* (2013.01); *H04W 76/15* (2018.02)

(58) Field of Classification Search
None
See application file for complete search history.

(56) References Cited

U.S. PATENT DOCUMENTS

| | | | | |
|---|---|---|---|---|
| 6,064,886 | A * | 5/2000 | Perez ..................... | H04W 84/14 455/426.2 |
| 2012/0069800 | A1* | 3/2012 | Soliman ................ | H04W 48/08 370/329 |
| 2015/0065144 | A1* | 3/2015 | Shen ................. | H04W 72/1215 455/438 |
| 2015/0181565 | A1 | 6/2015 | Sirotkin et al. | |
| 2016/0295462 | A1* | 10/2016 | Lunden ................. | H04W 76/19 |
| 2018/0027429 | A1* | 1/2018 | Li .......................... | H04W 40/22 455/426.1 |
| 2018/0160311 | A1 | 6/2018 | Shaw et al. | |
| 2019/0223017 | A1* | 7/2019 | Lai ......................... | H04W 60/00 |
| 2020/0163012 | A1* | 5/2020 | Zhu ........................ | H04W 12/08 |
| 2020/0367240 | A1* | 11/2020 | Sung ................. | H04W 36/0069 |

* cited by examiner

*Primary Examiner* — Suhail Khan
(74) *Attorney, Agent, or Firm* — Harrington & Smith

(57) ABSTRACT

An apparatus including control circuitry; first radio circuitry for communicating with a first radio circuitry of a first base station; second radio circuitry for communicating with second radio circuitry of a second base station; wherein the control circuitry is configured to use information received from a user equipment, for configuring the second radio circuitry of the apparatus such that a connection can be established between the second radio circuitry of the apparatus and the second radio circuitry of a base station.

20 Claims, 18 Drawing Sheets

Freq (3.400GHz to 3.800GHz)

APPARATUS, METHOD AND COMPUTER PROGRAM FOR NON-STAND-ALONE WIRELESS COMMUNICATIONS

FIELD

This disclosure relates to communications, and more particularly to radio implementation in a wireless communication system. More particularly the present invention relates to apparatus comprising antennas.

BACKGROUND

Fixed wireless access (FWA) is used to connect two fixed locations with a radio or other wireless link. Use of FWA is expected to expand in future.

STATEMENT OF INVENTION

According to a first aspect there is provided an apparatus comprising: control means; first radio means for communicating with first radio means of a base station; second radio means for communicating with second radio means of a base station; wherein the control means is configured to use information received from a user equipment, for configuring the second radio means of the apparatus such that a connection can be established between the second radio means of the apparatus and the second radio means of a base station.

According to an example, the information received from the user equipment comprises information indicative of at least one of: location; orientation; position of the second radio means of the apparatus.

According to an example, the control means is configured to configure the second radio means of the apparatus by causing alignment of an antenna beam of the second radio means with the second radio means of a base station.

According to an example, the second radio means of a base station comprises an antenna.

According to an example, the control means is configured to configure the first radio means of the apparatus such that a connection can be established between the first radio means of the apparatus and the first radio means of a base station, without using information received from a user equipment.

According to an example, the first radio means of the apparatus comprises an omni-directional antenna.

According to an example, the first radio means of the apparatus comprises a monopole antenna.

According to an example, the second radio means of the apparatus comprises a directional antenna.

According to an example, the second radio means comprises a microstrip patch antenna.

According to an example, the first and second radio means are disposed on a printed circuit board.

According to an example, the first radio means of the apparatus is configured to communicate with the first radio means of a base station using a first frequency band; and the second radio means of the apparatus is configured to communicate with the second radio means of a base station using a second frequency band.

According to an example, the first frequency band is different from the second frequency band.

According to an example the first frequency band overlaps with the second frequency band.

According to an example there is no overlap between the first frequency band and the second frequency band.

According to an example, the first frequency band comprises a 4G frequency band and the second frequency band comprises a 5G frequency band.

According to an example, the first radio means of a base station is comprised in a first base station, the second radio means of a base station is comprised in a second base station, the second base station being separate from the first base station.

According to an example, the first radio means of a base station is comprised in a same base station as the second radio means of a base station.

According to an example the apparatus comprises a customer premises equipment (CPE).

According to an example, the information from a user equipment comprises a prompt for a user to interact with the apparatus.

According to an example the information from a user equipment comprises a prompt for a user to manually change the location and/or position and/or orientation of the second radio means of the apparatus.

According to a second aspect there is provided an apparatus comprising at least one processor; and at least one memory including computer program code; the at least one memory and the computer program code configured to, with the at least one processor, cause the apparatus at least to perform: controlling a first radio part of the apparatus, the first radio part of the apparatus for communicating with a first radio part of a base station; controlling a second radio part of the apparatus, the second radio part of the apparatus for communicating with a second radio part of a base station; wherein the controlling the second radio part of the apparatus comprises using information received from a user equipment for configuring the second radio part of the apparatus such that a connection can be established between the second radio part of the apparatus and the second radio part of a base station.

According to an example, the information received from the user equipment comprises information indicative of at least one of: location; orientation; position of the second radio part of the apparatus.

According to an example, the at least one memory and the computer program code configured to, with the at least one processor, cause the apparatus at least to perform: configuring the second radio part of the apparatus by causing alignment of an antenna beam of the second radio part with the second radio part of a base station.

According to an example, the second radio part of a base station comprises an antenna.

According to an example, the at least one memory and the computer program code configured to, with the at least one processor, cause the apparatus at least to perform: configuring the first radio part of the apparatus such that a connection can be established between the first radio part of the apparatus and the first radio part of a base station, without using information received from a user equipment.

According to an example, the first radio part of the apparatus comprises an omni-directional antenna.

According to an example, the first radio part of the apparatus comprises a monopole antenna.

According to an example, the second radio part of the apparatus comprises a directional antenna.

According to an example, the second radio part comprises a microstrip patch antenna.

According to an example, the first and second radio parts are disposed on a printed circuit board.

According to an example, the first radio part of the apparatus is configured to communicate with the first radio part of a base station using a first frequency band; and the second radio part of the apparatus is configured to communicate with the second radio part of a base station using a second frequency band.

According to an example, the first frequency band is different from the second frequency band.

According to an example the first frequency band overlaps with the second frequency band.

According to an example there is no overlap between the first frequency band and the second frequency band.

According to an example, the first frequency band comprises a 4G frequency band and the second frequency band comprises a 5G frequency band.

According to an example, the first radio part of a base station is comprised in a first base station, the second radio part of a base station is comprised in a second base station, the second base station being separate from the first base station.

According to an example, the first radio part of a base station is comprised in a same base station as the second radio part of a base station.

According to an example the apparatus comprises a customer premises equipment (CPE).

According to an example, the information from a user equipment comprises a prompt for a user to interact with the apparatus.

According to an example the information from a user equipment comprises a prompt for a user to manually change the location and/or position and/or orientation of the second radio means of the apparatus.

According to a third aspect there is provided a method comprising: controlling first radio means of an apparatus, the first radio means of the apparatus for communicating with first radio means of a base station; controlling second radio means of the apparatus, the second radio means of the apparatus for communicating with second radio means of a base station; wherein the controlling second radio means of the apparatus comprises using information received from a user equipment for configuring the second radio means of the apparatus such that a connection can be established between the second radio means of the apparatus and the second radio means of a base station.

According to an example, the information received from the user equipment comprises information indicative of at least one of: location; orientation; position of the second radio means of the apparatus.

According to an example, the configuring the second radio means of the apparatus comprises causing alignment of an antenna beam of the second radio means of the apparatus with the second radio means of a base station.

According to an example, the controlling the first radio means of the apparatus comprises configuring the first radio means of the apparatus such that a connection can be established between the first radio means of the apparatus and the first radio means of a base station, without using information received from a user equipment.

According to an example, the first radio means of the apparatus comprises an omni-directional antenna.

According to an example, the first radio means of the apparatus comprises a monopole antenna.

According to an example, the second radio means of the apparatus comprises a directional antenna.

According to an example, the second radio means of the apparatus comprises a microstrip patch antenna.

According to an example, the first and second radio means of the apparatus are disposed on a printed circuit board.

According to an example, the apparatus comprises a customer premises equipment (CPE).

According to an example, the information from a user equipment comprises a prompt for a user to interact with the apparatus.

According to an example the information from a user equipment comprises a prompt for a user to manually change the location and/or position and/or orientation of the second radio means of the apparatus.

According to an example the prompt is displayed on a display of the user equipment.

According to an example, the first radio means is configured to communicate with the first base station using a first frequency band; and the second radio means is configured to communicate with the second base station using a second frequency band, the first frequency band comprising a 4G frequency band and the second frequency band comprising a 5G frequency band.

According to an example, the first frequency band is different from the second frequency band.

According to an example the first frequency band overlaps with the second frequency band.

According to an example there is no overlap between the first frequency band and the second frequency band.

According to a fourth aspect there is provided a computer program comprising instructions for causing an apparatus to perform at least the following: controlling first radio means of the apparatus, the first radio means of the apparatus for communicating with first radio means of a base station; controlling second radio means of the apparatus, the second radio means of the apparatus for communicating with second radio means of a base station; wherein the controlling second radio means of the apparatus comprises using information received from a user equipment for configuring the second radio means of the apparatus such that a connection can be established between the second radio means of the apparatus and the second radio means of the base station.

According to a fifth aspect there is provided a computer program comprising instructions stored thereon for performing at least the following: controlling first radio means of an apparatus, the first radio means of the apparatus for communicating with first radio means of a base station; controlling second radio means of the apparatus, the second radio means of the apparatus for communicating with second radio means of a base station; wherein the controlling second radio means of the apparatus comprises using information received from a user equipment for configuring the second radio means of the apparatus such that a connection can be established between the second radio means of the apparatus and the second radio means of the base station.

According to a sixth aspect there is provided a non-transitory computer readable medium comprising program instructions for causing an apparatus to perform at least the following: controlling a first radio part of the apparatus, the first radio part of the apparatus for communicating with a first radio part of a base station; controlling a second radio part of the apparatus, the second radio part of the apparatus for communicating with a second radio part of a base station; wherein the controlling the second radio part of the apparatus comprises using information received from a user equipment for configuring the second radio part of the apparatus such that a connection can be established between the second radio part of the apparatus and the second radio part of the base station.

According to a seventh aspect there is provided a non-transitory computer readable medium comprising program instructions stored thereon for performing at least the following: controlling a first radio part of the apparatus, the first radio part of the apparatus for communicating with a first radio part of a base station; controlling a second radio part of the apparatus, the second radio part of the apparatus for communicating with a second radio part of a base station; wherein the controlling the second radio part of the apparatus comprises using information received from a user equipment for configuring the second radio part of the apparatus such that a connection can be established between the second radio part of the apparatus and the second radio part of the base station.

BRIEF DESCRIPTION OF FIGURES

The invention will now be described in further detail, by way of example only, with reference to the following examples and accompanying drawings, in which.

DETAILED DESCRIPTION

Traditionally, the focus of fixed wireless access (FWA) has been towards bringing high-speed internet connection wirelessly to households and enterprises. FWA may have particular usefulness in rural and suburban areas, where using fiber-optic cables is not economically feasible. However, with mm-wave radio systems emerging with 5G (28 GHz, 39 GHz), and increased maturity of un-licensed 60 GHz radio systems, FWA may also become an attractive option for implementing high-speed wireless internet connections in urban and dense urban environments.

Accordingly, at least some examples disclosed herein relate to radio system implementation for 5G NSA (Non-Stand-Alone).

3GPP release 15, for example, defines certain aspects of 5G NSA implementation. Currently the 5G system is not capable of operating independently. Accordingly there is a need to complement the operation of the 5G system with a legacy radio system, for example 4G (LTE). This is needed in early and intermediate stages of deployment of 5G networks, before entering full 5G standalone implementations.

Figure 1:
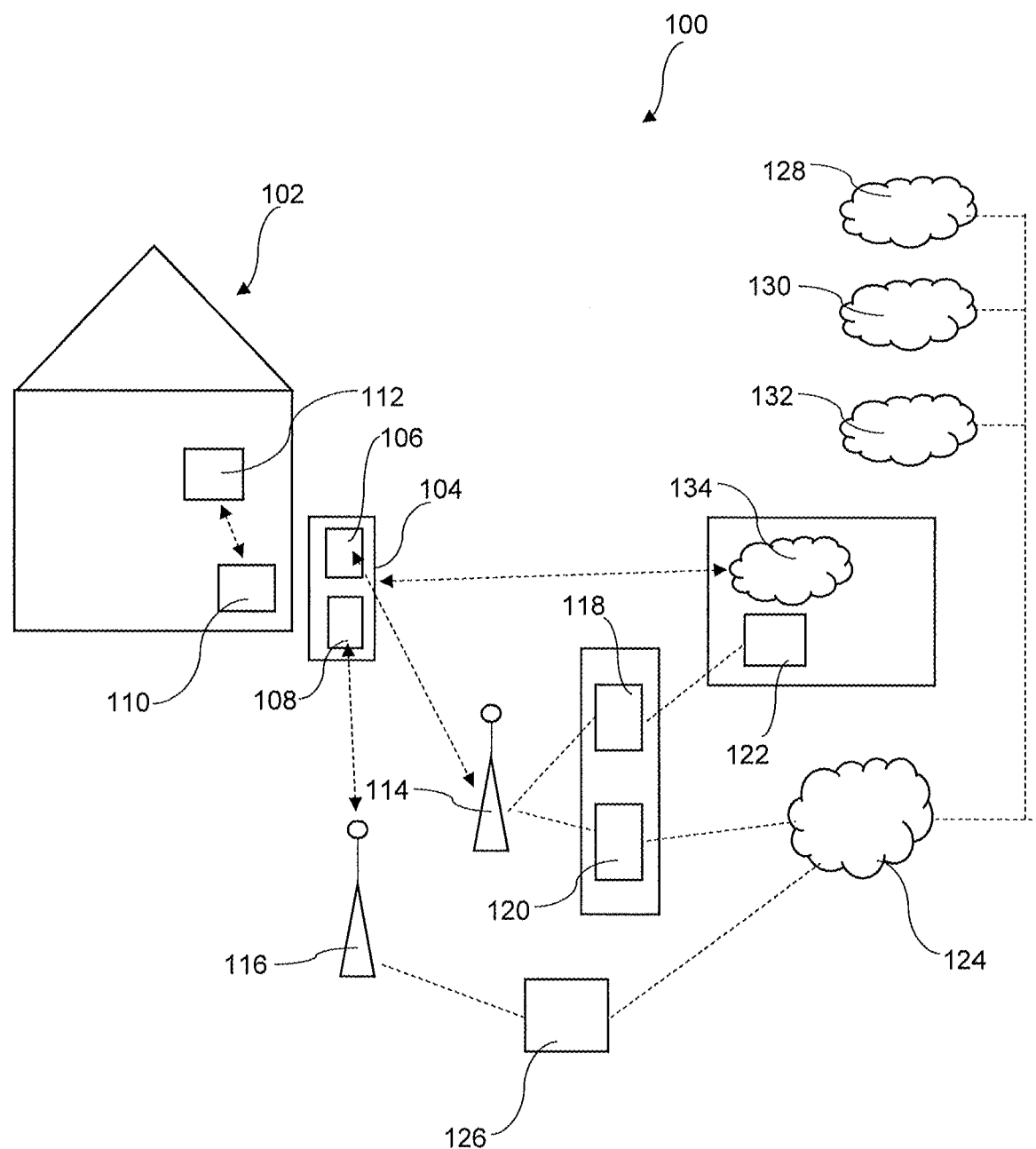
FIG. 1 shows a schematic example of a wireless communication system where the invention may be implemented.

An example 5G NSA system 100 is shown in FIG. 1. The system comprises customer premises 102. The customer premises may for example be a building such as home, office, factory etc. Customer premises 102 comprises customer premises equipment (CPE) 104. The CPE 104 may be attached to an exterior of the customer premises, for example. The CPE 104 may be considered to comprise one end of a radio link, for example enabling the customer premises (or devices in or proximate to the customer premises) to communicate with the wider radio network. To this end, the CPE may comprise at least one radio part. In the example of FIG. 1 the CPE 104 comprises a first radio part 106 and a second radio part 108. Each radio part 106 and 108 may comprise, for example, a modem or an antenna. The customer premises 102 also comprises a router 110 for routing communications to one or more user equipment (UE) 112. In some examples the router 110 is external to a housing of the CPE 104. In other examples the router 110 may be comprised in the housing of the CPE 104. In some examples the functionality of the CPE 104 to communicate with one or more UEs 112 is integrated entirely within the CPE 104 housing. The CPE 104 may be located inside or outside the premises 102 (or in some examples partly inside and partly outside). The one or more UE 112 may comprise, for example, one or more of: phone; tablet; laptop; PC; IPTV etc.

The CPE 104 communicates with one or more wireless network nodes. In the example of FIG. 1, first radio part 106 is in communication with a 4G LTE base station 114, and second radio part 108 is in communication with a 5G LTE base station 116. The base station 114 is in communication with mobility management entity (MME) 118 and gateway 120. Via the MME 118 the base station can communicate with, for example, Home Subscriber Server 122. Via gateway 120 the base station 114 can communicate with the core network (CN), shown schematically at 124. Base station 116 connects to core network 124 via gateway 126. Third party services may be made available via core network 124. Such third party services may include, for example, IPTV shown schematically at 128, the Internet shown schematically at 130, VoIP services shown schematically at 132.

A controller is shown schematically at 134. In this example the controller 134 is configured to control a CPE 104. In some examples the controller 134 communicates directly with CPE 104. In some examples the controller 134 communicates indirectly with CPE 104 e.g. via base station 114 or via base station 116. In some examples the controller 134 comprises computer software. In some examples the controller 134 is located in the cloud. The controller 134 may be configured to manage, provision, and monitor the CPE 104 (and possibly one or more further CPEs). For example the controller 134 may control one or more of: customer specific configuration; capacity management; fault management; performance monitoring; and firmware/SW updates of the CPE 104.

In some examples there is also provided an install application enabling optimal installation of the CPE 104, for example to enable positioning of the CPE to the optimum wall of the house in a manner so that a beam of a directive antenna of the CPE is pointing towards a desired base station. This may further enable optimal radio link performance, and provides high throughput (TP) even over long distances. In some examples the install application may be available as a mobile or smartphone application. The mobile app may obtain e.g. GPS (Global Positioning System) coordinates of the desired base station from controller 134, and parameters describing reception quality (e.g. RSRP (Reference Signal Received Power), RSSI (Received Signal Strength Indicator)) for CPE 104. This information, com- The antenna part 242 may comprise one or more directional antenna and/or one or more omni-directional antenna. Some of the differences between directional and omni-directional antennas are shown in Table 1 below.

TABLE 1

| | Applications | Antennas | Size | Gain | Band width | Polarization | Multi band Support | Beam forming | Interference mitigation | Diversity |
|---|---|---|---|---|---|---|---|---|---|---|
| Directional | Fixed | E.g. patches, any type of antenna arrays, many other | Large Patch~ 0.5λ and 0.5λ to λ spacing in arrays Typically high size/ profile in Z | Typically 6-8 dBi single antenna >> gain in arrays | Narrow, radiation pattern has beam a like shape | Pure polarization, typically dual polarized antennas are used. Polarization discrimination up to 20 ... 25 dB | In some cases adjacent bands can be covered with same antenna array | Yes, there are means to manipulate the radiation pattern and polarization of an antenna array | Narrow beam filters interference coming outside of beam direction. | Typically polarization diversity |
| Omni | Mobile | e.g. Dipole, monopole and their derivatives | Small (e.g. a wire) Monopole~ 0.25λ Dipole ~0.5λ Typically low size/ profile in Z | Typically 5 ... 3 dBi, the gain maxima may not point to the desired direction Antenna efficiency or average gain are used as figure of merit | In typical case there is no beam in radiation pattern and e.g. HPBW can't be properly defined. | Mixed polarization with typically very limited amount of means to manipulate the polarization | More means to create multiband antennas, also to bands locating apart in frequency | No, in most cases the device chassis contributes to the radiation and leaves very few means to manipulate the radiation on pattern and polarization | Omni-directional radiation pattern captures interferences all around, however there is low gain which helps a bit in the interference mitigation | Radiation pattern and/or spatial diversity | bined with the internal compass of a smart phone enables a guided CPE installation procedure for placing the CPE in an optimal location and/or position at the customer premises. The mobile app may also, for example, enable control of electrical beam steering of the CPE antenna or lock the beam to a direction providing the best received signal quality.

Although FIG. 1 shows the CPE 104 located external to the premises 102, it will be understood that in some examples the CPE 104 may be located within the premises. In some examples the CPE 104 may be partly located externally and partly located internally to the premises 102. In some examples, the CPE 104 may support sub 6 GHz 5G NSA.

Figure 2:
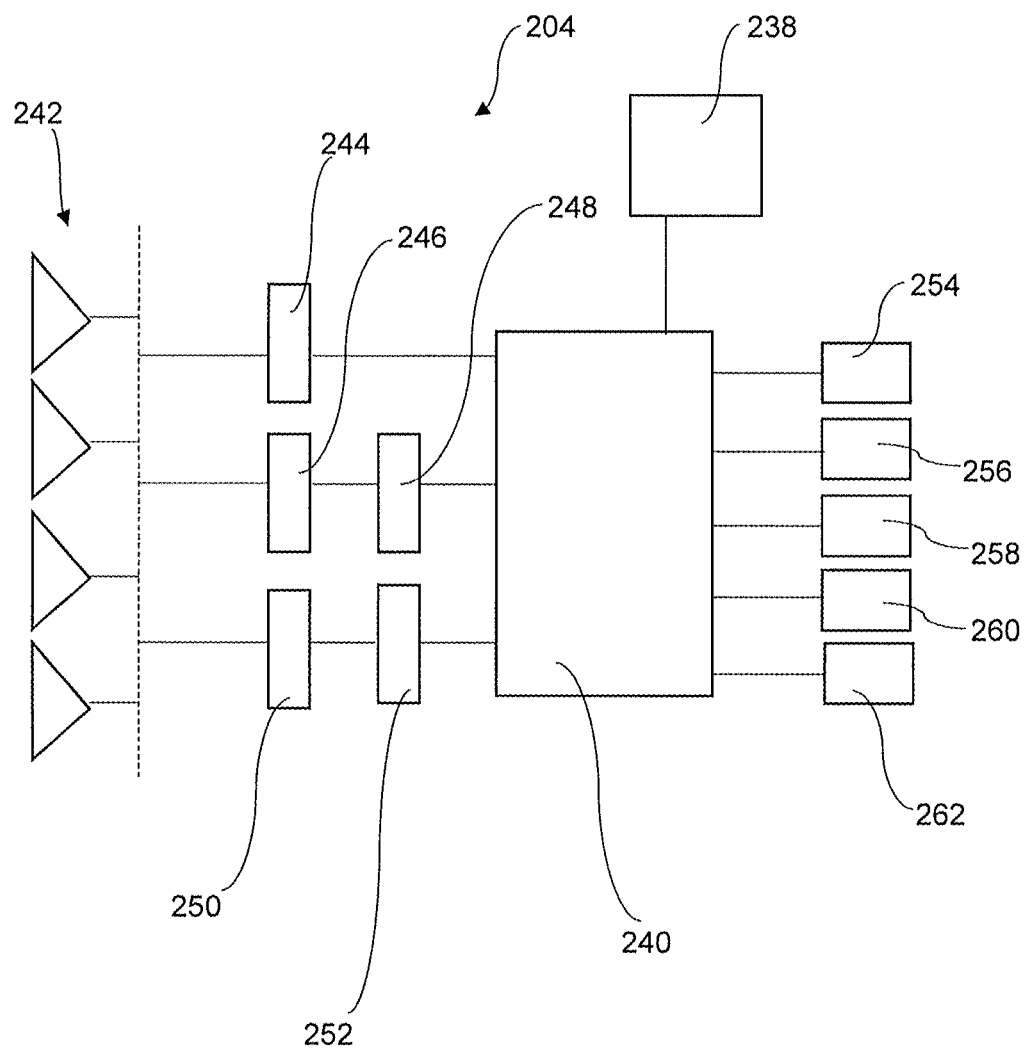
FIG. 2 schematically shows architecture of a customer premises equipment (CPE) according to an example.

FIG. 2 schematically shows an example architecture of a CPE 204, The CPE 204 comprises a processor or CPU 240. The CPE 204 further comprises a memory 238 which is in communication with processor 240. The CPE 204 comprises an antenna part, shown at 242. An antenna control module is shown at 244. A first modem is shown at 248. In this example the first modem 248 comprises an LTE modem. An LTE radio frequency integrated circuit (RF IC) is schematically shown at 246. A second modem is shown at 252. In this example the second modem 252 comprises a 5G modem. A 5G radio frequency integrated circuit (RF IC) is schematically shown at 250. The example CPE 204 also comprises a POTS (plain old telephone service) module 254. A power control module is shown at 256. A WiFi module or interface is shown at 258, for enabling connection to WiFi. A cable or wire connection module or interface is shown at 260. For example, interface 260 may enable an Ethernet cable to be connected to the CPE 204. A USB module or interface is shown at 262 for enabling connection of a USB device.

It will be understood that the features shown in FIG. 2 may be combined with other examples of CPEs provided herein.

A technical problem is creating optimal radio and antenna end-to-end system implementation. For example, in the present context a technical problem is creating optimal radio and antenna end-to-end system implementation for 5G NSA CPE devices. Problems which may be caused by non-optimal implementation include non-optimal radio resource use and RF spectral inefficiency, poor radio performance, excessive device size, cost and power consumption. In some situations these problems can also be extended to any two or more interoperating radio systems.

Figure 3:
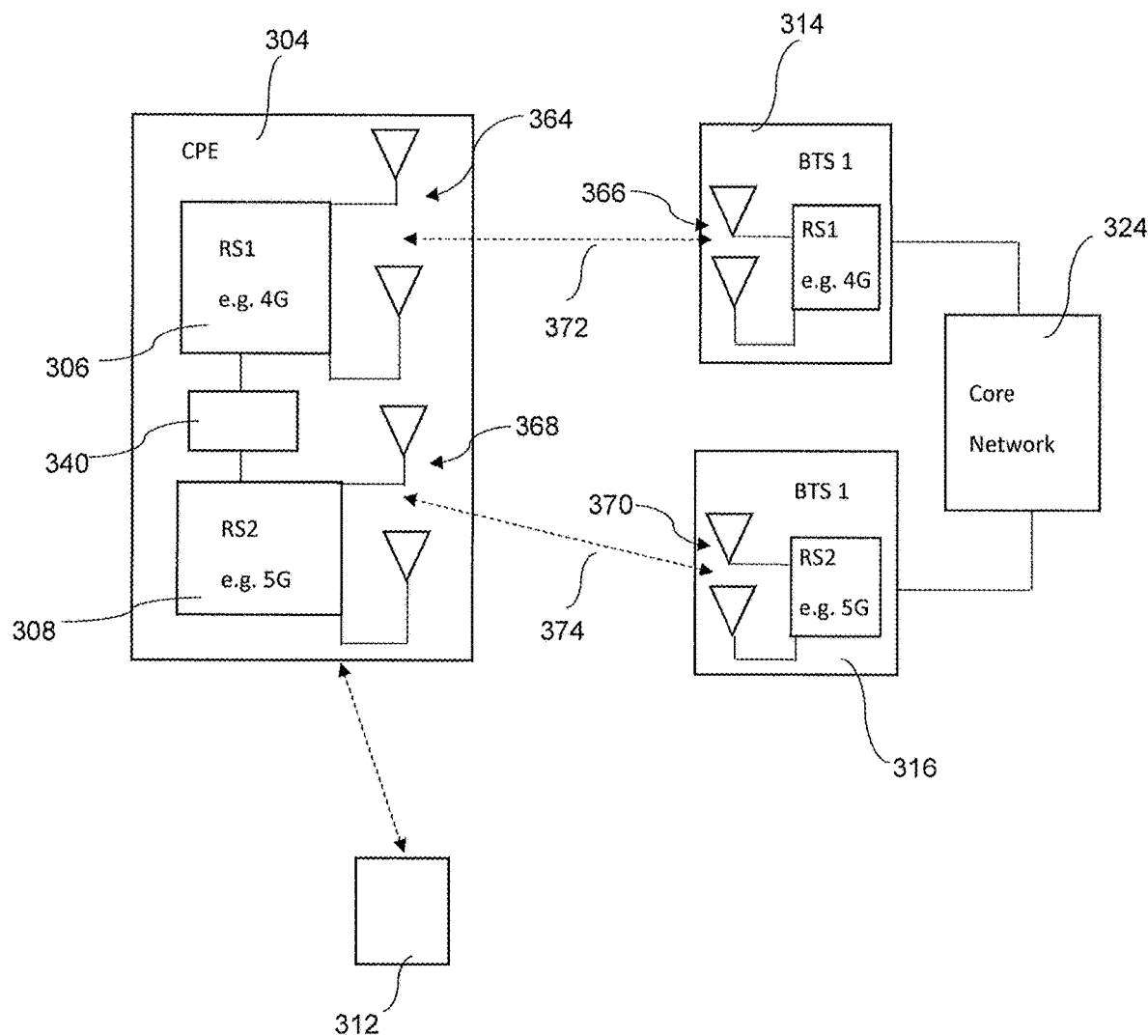
FIG. 3 schematically shows an example of a radio system according to an example.

FIG. 3 shows in more detail a CPE apparatus 304, configured for communication with a first base station 314 and a second base station 316 in a radio network. The CPE 304 comprises a controller or control means 340. A first radio part or radio system (RS) (or radio means) is shown at 306. The first radio part 306 comprises an antenna or antenna array 364. In this example the first radio part 306 is configured to operate with a 4G network. For example the first radio part 306 is configured for communication with a 4G base station 314. The 4G base station 314 comprises an antenna or antenna array 366. In the example of FIG. 3 the first radio part 306 communicates with base station 314 over radio link 372. Radio link 372 may be considered a first radio link. A second radio part or radio system (RS) (or radio means) is shown at 308. The second radio part 308 comprises an antenna or antenna array 368. In this example the second radio part 308 is configured to operate with a 5G network. For example the second radio part 308 is configured for communication with a 5G base station 316. The 5G base station 316 comprises an antenna or antenna array 370. In the example of FIG. 3 the second radio part 308 communicates with base station 316 over radio link 374. Radio link 374 may be considered a second radio link. The first and second base stations 314 and 316 are connected to the core network, shown schematically at 324. Although in the example of FIG. 3 the first and second base stations 314 and 316 are shown as separate entities for ease of explanation (and in some examples this may indeed be the case), it will be understood that in other examples the first and second base stations (or indeed antennas 366 and 370) may be comprised in a same base station or mast. Therefore reference to a first base station and a second base station may be considered to mean, in some examples, first and second radio means or first and second antennas of a base station.

According to an example, one of the first and second radio parts 306 and 308 is configured for control plane signalling, and the other of the first and second radio parts 306 and 308 is configured for user plane signalling. According to an example the first radio part 306 is configured to communicate control plane signalling. For example control plane signalling occurs over first radio link 372 with first base station 314. According to an example the second radio part 308 is configured to communicate user plane signalling and/or data. For example user plane signalling and/or data communication occurs over second radio link 374 with second base station 316. According to some examples the first radio part 306 does not communicate user plane signalling and/or data, during registration/installation of the CPE. According to some examples the second radio part 308 does not communicate control plane signalling during installation/registration of the CPE. Therefore according to some examples the first radio part 308 is configured to communicate control plane signalling but does not communicate user plane signalling and/or data, whereas the second radio part 308 is configured to communicate user plane signalling and/or data but does not communicate control plane signalling, during registration or installation of the CPE. According to some examples the control plane signalling between the first radio part 306 and the first base station 314 is used for one or more of: subscription identification; device identification; cell selection; device to cell registration. According to some examples the user plane signalling between the second radio part 308 and the second base station 316 is used for communicating data.

A user equipment is schematically shown at 312. The CPE 304 is configured for communication with UE 312. For example the CPE may communicate with the UE 312 for installation and/or registration of the CPE 304. For example the CPE may communicate with the UE 312 for installation and/or registration of the CPE 304 with the 5G base station 316.

Accordingly it may be considered that according to some examples the present disclosure provides two radio links for a 5G NSA CPE. A high-performance radio link 374 (5G) is provided for user plane signals, and a radio link 372 (4G) is provided to provide balanced performance with control plane signals. These links 372 and 374 may be utilised by controller 340 to provide controller services and seamless interaction between 4G and 5G. More generally, it may be considered that a first radio means of an apparatus is configured to communicate with a first radio means of a base station, and a second radio means of the apparatus is configured to communicate with a second radio means of a base station. According to some examples the first radio means of the apparatus and base station utilises a first frequency band. According to some examples the second radio means of the apparatus and base station utilises a second frequency band. According to some examples, the first frequency band is different from the second frequency band. According to some examples the first frequency band overlaps with the second frequency band. According to some examples there is no overlap between the first frequency band and the second frequency band, therefore the first frequency band is distinct from the second frequency band. According to some examples the first radio means of a base station is comprised in a first base station, the second radio means of a base station comprised in a second base station, the second base station being separate from the first base station. According to some examples, the first radio means of a base station is comprised in a same base station as the second radio means of a base station.

Characteristics of the first radio link 372 (4G) may be considered to include: large spatial coverage of antenna beam; low MIMO (multiple-input-multiple-output); capability to tolerate low/moderate throughput (TP); low/moderate SNIR (signal to noise interference ratio); low/moderate MCS (modulation and coding scheme); no need for user controlled device installation procedure to align the antenna beam towards a base station.

Characteristics of the second radio link 374 may include: high gain narrow antenna beam; high MIMO; high TP; high SNIR; high MCS; a need for user controlled device installation procedure to align the antenna beam towards a base station.

This means that in principle the installation can start immediately after the power is turned on for the CPE, despite or regardless of the actual location of the CPE.

Tables 2 and 3 below describe in more detail antenna implementation to provide the aforesaid first and second radio links.

Table 2 below provides details of antenna and radio system properties for a 4G radio system e.g. antenna or antenna array 364 shown in FIG. 3.

TABLE 2

| Feature | Characteristic | with numbers | |
|---|---|---|---|
| Size | Compact | e.g. Wire antenna like planar monopole | |
| Radiation pattern | Omni-directional | Max directivity < 5 dBi | |
| Polarization | Mixed | XPD < 10 dB | |
| Diversity | Spatial, radiation pattern, polarization | ECC < 0.3 | |
| Frequency band support | Multiband with non-adjacent frequency bands, multiband including <1 GHz bands | N/A | |
| TX MIMO | SISO for TX | | |
| RX MIMO | SISO Or MIMO | Max 2 × 2 MIMO | |

TABLE 2-continued

| Feature | Characteristic | with numbers | |
|---|---|---|---|
| Max transmit power | Moderate | 15 to 24 dBm | |
| Installation procedure used for aligning the antenna beam towards to base station | No | N/A | |

Table 3 below provides details of antenna and radio system properties for a 5G radio system e.g. antenna or antenna array 370 shown in FIG. 3.

TABLE 3

| Feature | Characteristic | With numbers | |
|---|---|---|---|
| Size | Large | e.g. microstrip patch antenna or antenna array | |
| Radiation pattern | Directive | Max directivity > 8 dB | |
| Polarization | Pure | Linear with XPD > 15 dB | |
| Diversity | Polarization | Dual polarized antenna with ±45* linear polarization | |
| Frequency band support | Single-band or multiband | Multiband antenna covers bad adjacent in frequency | |
| TX MIMO | SISO or MIMO (preferred) | 2 × 2, 4 × 4 or higher | |
| RX MIMO | MIMO | 2 × 2, 4 × 4 or higher | |
| Maximum transmit power | High | >22 dBm | |
| Installation procedure used for aligning the antenna beam towards to base station | Yes | N/A | |

As described above, according to some examples there is an installation or registration procedure for the CPE. The registration procedure may be considered to comprise the CPE 304 forming connections in the network (e.g. to one or more base stations) necessary for the CPE to function. Registration may also include the CPE 304 being registered by a network entity in the core network 324 e.g. in a centralised server.

According to some examples, registration of the CPE 304 to the 4G base station 314 occurs automatically or autonomously by the CPE. For example, in response to being switched on, the CPE 304 may begin searching for a suitable 4G base station to connect to. In examples, the 4G radio part 306 comprises an omni-directional antenna, meaning that even if the CPE is not optimally oriented or located relative to a 4G base station, then communication between 4G radio part 306 and 4G base station 314 can still occur at least to a satisfactory level.

In some examples, registration of CPE 304 to a 5G base station (e.g. base station 316) requires some level of interaction between CPE 304 and a further apparatus. For example communication may be required between the CPE 304 and a UE 312. This is because in some examples the 5G radio part 308 comprises a directional antenna, and some level of control or communication is required in order to point the directional antenna towards the 5G base station 316. Therefore, in some examples the controller 340 is configured to use information received from a user equipment 312, for establishing a connection with the second base station 316. According to some examples the information received from the user equipment 312 comprises information indicative of a location of the CPE 304 (and accordingly indicative of a location of the second radio means 308). The location information may comprise GPS coordinates for example. According to some examples the information received from the UE 312 comprises information indicative of an orientation of the CPE 304 (and accordingly indicative of an orientation of the second radio means 308). The orientation information may comprise information obtained from a compass of the UE 312. According to some examples the information received from the UE 312 comprises position information. The position information may comprise, for example, whether the CPE 304 is inside or outside, attached to a wall or floor mounted etc.

According to some examples the UE 312 may communicate information with the CPE 304 without need for user interaction (e.g. by a user of the UE 312). For example the UE 312 may communicate with CPE 304 without providing any feedback to the user (e.g. visual, tactile or audible feedback).

In some examples user interaction is required, in which case the UE 312 may provide a visual, tactile or audible prompt to a user, indicating to the user that action by the user is required. For example the prompt may indicate to the user that the user needs to physically alter one or more of the location; orientation; position of the CPE. The prompt may also indicate to the user in what manner the location, orientation, position should be changed. The user may provide input via the UE 312 (e.g. on a user interface thereof) in order to effect the necessary change. Additionally or alternatively the prompt may prompt the user to physically move the CPE 304 themselves. For example the UE 312 may provide a prompt to a user to change the orientation of the CPE 304. Additionally or alternatively the prompt may prompt the user to move the location of the CPE 304. In some examples the communication with the user is via a CPE install application on the UE 312. The CPE install application may be downloaded to the UE 312. The application may comprise an install "wizard". The application may be displayed on a display of the UE 312. The prompts may also be displayed on a display of the UE 312, and/or audible prompts may be provided via speakers of the UE 312.

According to some examples the controller 340 configures the second radio means 308 such that a connection can be established between the second radio means 308 and the second base station 316 by causing alignment of an antenna beam of the second radio means 308 with the second base station 316. In some examples this comprises utilising beamforming techniques. The beamforming may comprise an electrical beamforming technique. In some examples the beam has a fixed directivity radiated from the CPE, and so the beam direction is only altered by moving the CPE itself so that the beam is lined up with the BTS 316. In some examples this comprises manual movement of the CPE (i.e. by a user). In some examples the beamforming technique may comprise adjusting a transmit power of the second radio means. The beamforming technique may additionally or alternatively comprise one or more of: movement; rotation: steering, of an antenna of the second radio means. The beamforming technique may additionally comprise controlling beam direction using phase shifters and adjusting the phase of radio frequency signals applied to the antenna array (and conversely to RF signals arriving at the antenna array and being received by the radio means 308). The beamforming may comprise user input, e.g. via CPE install application as described above.

According to some examples, information is provided from CPE 304 to UE 312 once the second radio means 308 has been successfully configured. For example, information may be provided from CPE 304 to UE 312 once an antenna of the second radio means 308 has been successfully aligned with the second base station. The information of successful configuration of the second radio means 308 may be conveyed visually on the display of the UE 312, and/or audibly via speakers of the UE 312, and/or haptic feedback may be provided.

According to some examples, information is provided from CPE 304 to UE 312 once the first radio means 306 has been successfully configured. The information of successful configuration of the first radio means 306 may be conveyed visually on the display of the UE 312, and/or audibly via speakers of the UE 312, and/or haptic feedback may be provided.

According to some examples, information indicating successful configuration is conveyed to the user on UE 312 only once both first and second radio means 306 and 308 are successfully configured.

According to some examples, the controller 340 is configured to establish a connection between the first radio means 306 and the first base station 314, without using information received from a user equipment. That is in some examples the CPE 304 may autonomously or automatically connect to the first base station 314.

An arrangement of the first and second radio parts is described in more detail with respect to FIGS. 4A to 6. As will be explained in more detail the antenna structure is composed of printed circuit boards (PCB) mounted to each other such that there is an air gap between the boards.

Figure 4A:
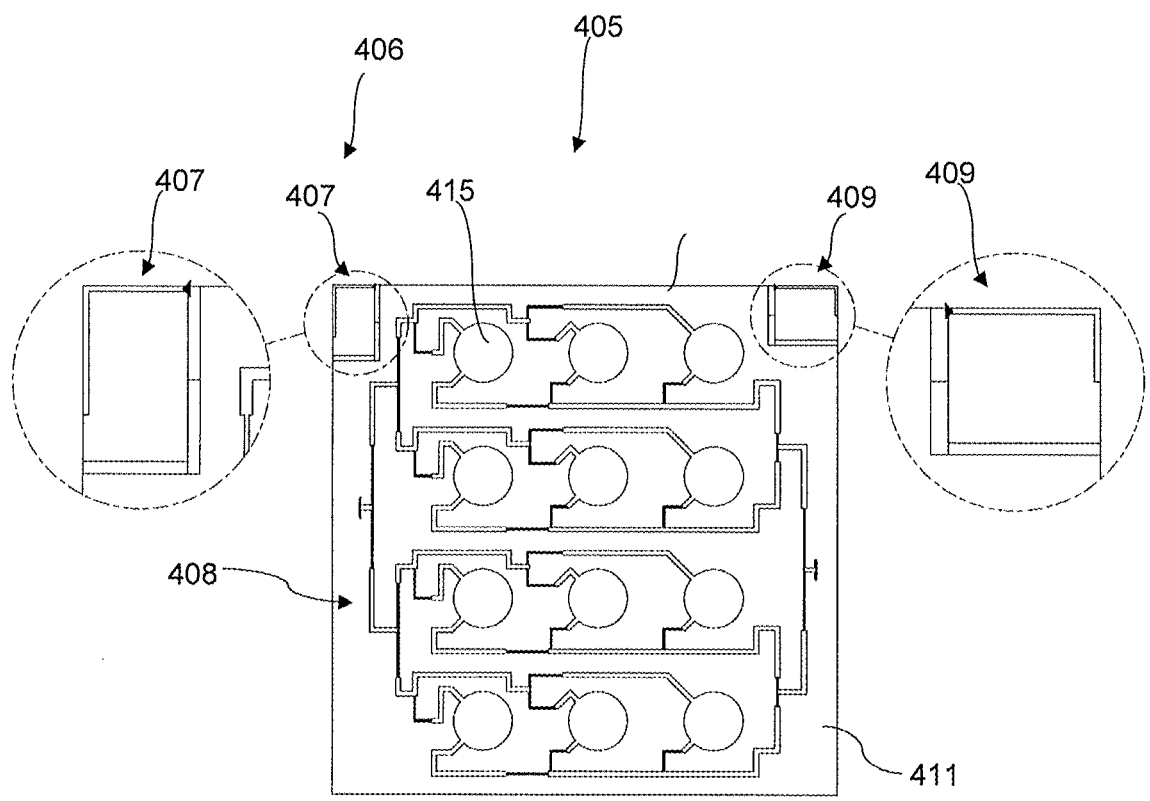
FIGS. 4A and 4B schematically show an antenna arrangement according to an example.

FIG. 4A schematically shows an antenna arrangement 405 comprising first radio means 406 and second radio means 408. In this example the first radio means 406 comprises two omnidirectional mixed polarised planar monopole antennas with impedance matching circuits. In FIG. 4A the two antennas are shown at 407 and 409 (and in an enlarged form in the balloons). In the example of FIG. 4A the antennas 407 and 409 are placed in respective corners of PCB 411. In some examples the antennas 407 and 409 support 700/1800/1900/2100/2400 MHz LTE bands. Both antennas 407 and 409 support 2×2 MIMO.

In some examples the second radio means 408 comprises a patch antenna array. More particularly, in the example of FIG. 4A the second radio means 408 comprises a 3×4 dual polarised microstrip patch antenna array. One of the antenna elements in the array is schematically shown at 415. In some examples the second radio means 408 comprises an appropriate RF signal feed and power divide network. According to some examples the second radio means 408 supports 3.5 GHz 5G band (3400-3800 MHz).

Figure 4B:
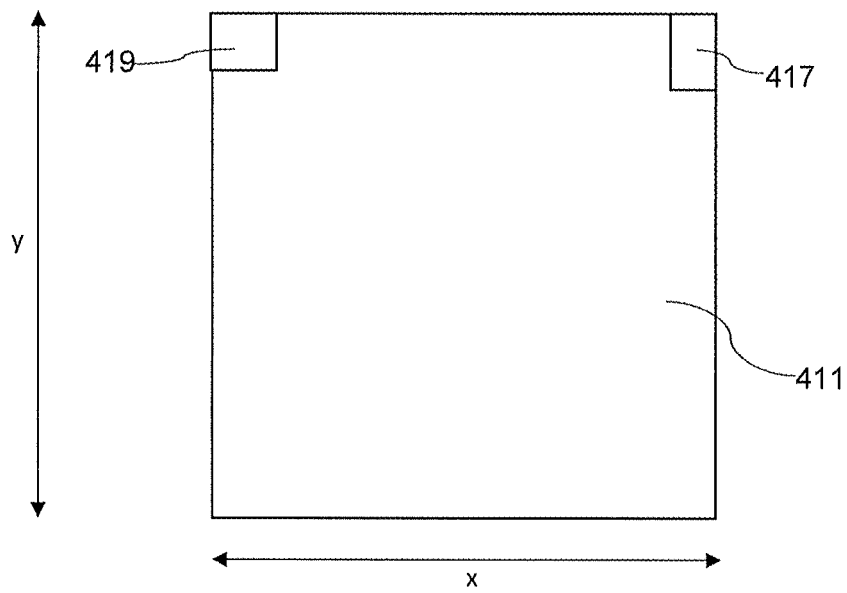

FIG. 4B shows an underside of the board of FIG. 4A. The view of FIG. 4B shows copper openings 417 and 419 for the LTE antennas 407 and 409 respectively.

According to some examples the PCB 411 is rectangular in plan view. According to some examples the PCB 411 has dimensions of x by y. In some examples x=200 mm and y=200 mm i.e. board 411 is square.

Figure 5A:
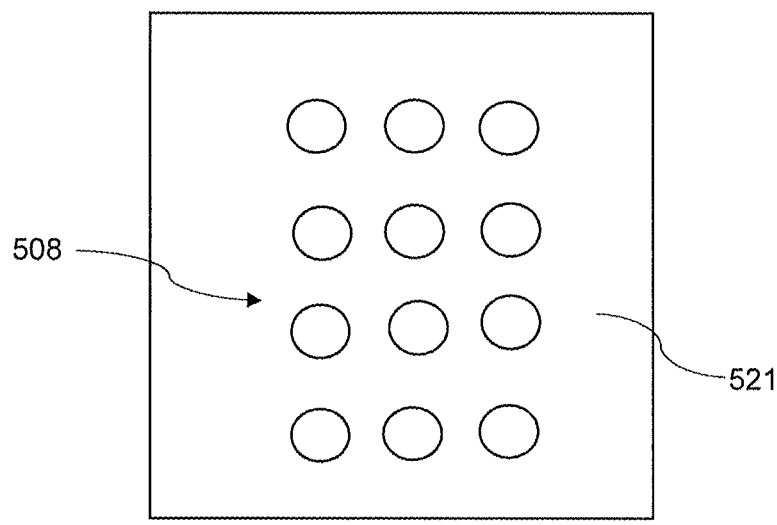
FIGS. 5A and 5B schematically show an antenna arrangement according to an example.
Figure 5B:
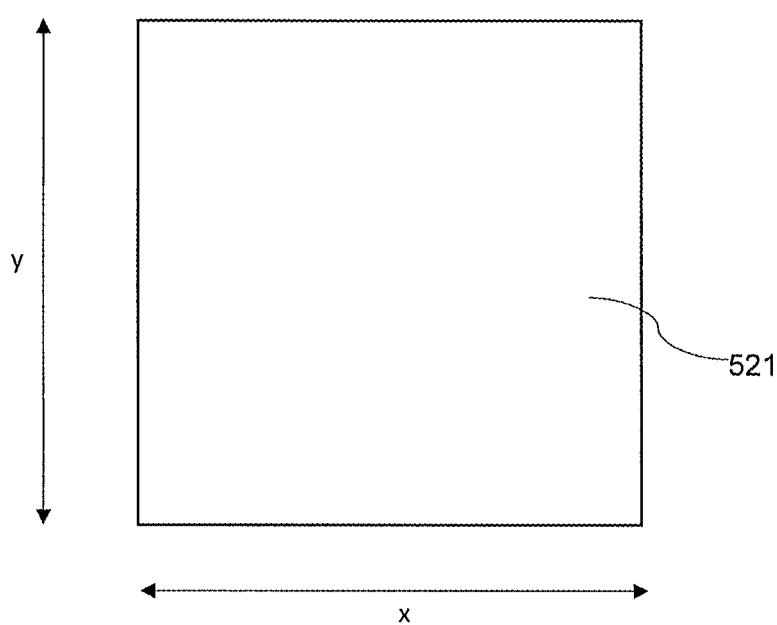

Whereas FIG. 4A shows a first board 411 of antenna arrangement 405, FIG. 5A shows second board 521. In some examples first board 411 comprises a top or upper board, and second board 521 comprises a bottom or lower board. According to some examples board 521 comprises a PCB. Antenna elements of the second radio means are schematically shown at 508.

According to some examples the board 521 is rectangular in plan view. According to some examples the board 521 has dimensions of x by y. In some examples x=200 mm and y=200 mm i.e. board 521 is square.

Figure 6:
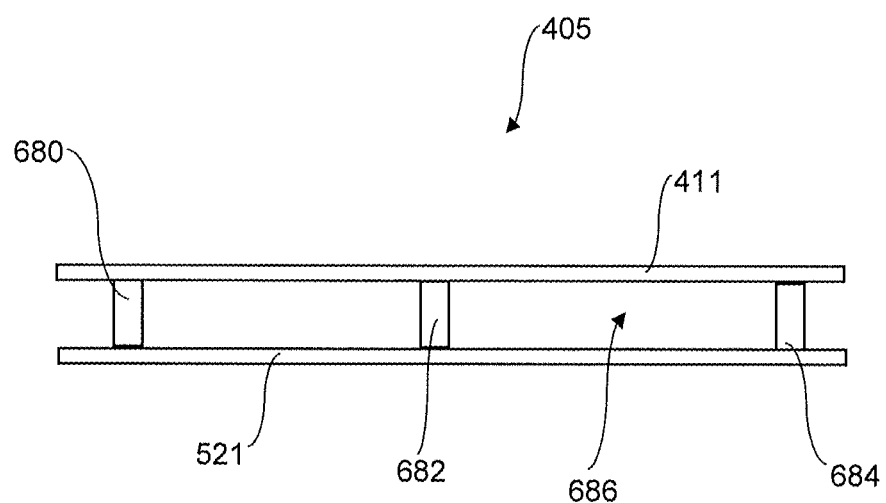
FIG. 6 schematically shows an antenna arrangement according to an example.

FIG. 6 is a side view schematically showing board 411 connected to board 521 by fixing means or one or more connectors. In this example the fixing means comprises connectors 680, 682 and 684. An air gap 686 is present between the board 411 and the board 521.

Accordingly the antenna arrangement 405, in some examples, comprises using small sized low directivity omnidirectional mixed polarized antennas covering multiple frequency bands for the 4G radio system used for control plane signals, and larger sized directive dual polarized highly directive narrower frequency band antenna with an appropriate install procedure for the 5G radio system used for user plane signals.

Figure 7:
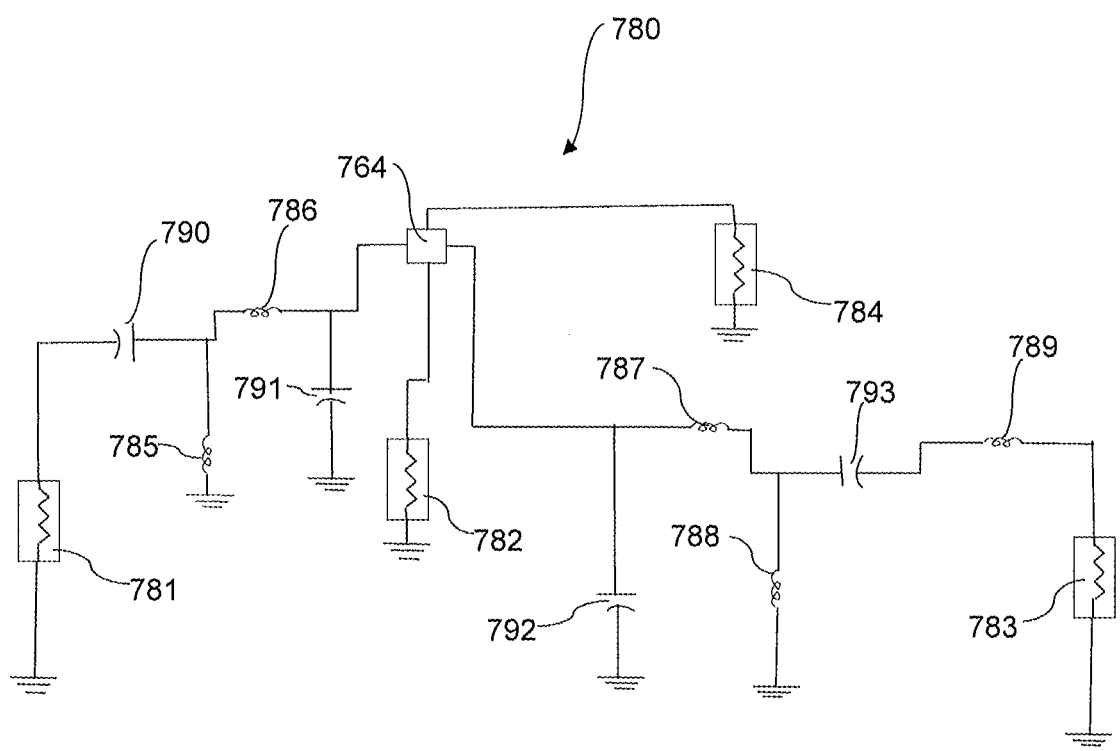
FIG. 7 schematically shows an impedance matching circuit for an LTE antenna according to an example.

FIG. 7 schematically shows an impedance matching circuit for an LTE antenna (e.g. antenna 364 of FIG. 3) according to an example. The impedance matching circuit comprises resistors 781, 782, 783 and 784. The circuit 780 also comprises inductors 785, 786, 787, 788 and 789. The circuit 780 also comprises capacitors 790, 791, 792 and 793. The antenna is schematically shown at 764. Therefore it may be considered that the LTE antenna comprises an impedance matching circuit.

Figure 8A:
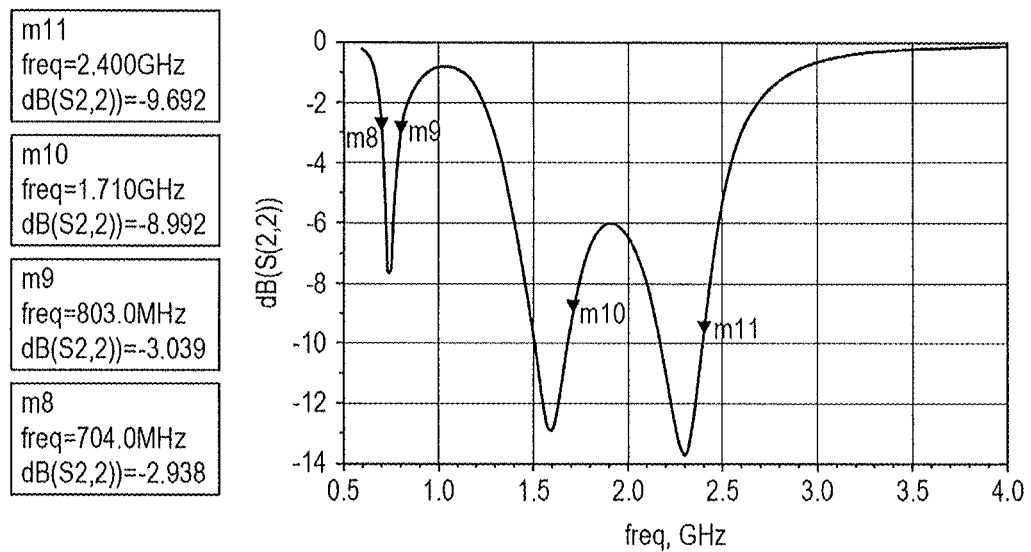
FIGS. 8A and 8B schematically show input impedance for an LTE antenna according to an example.
Figure 8B:
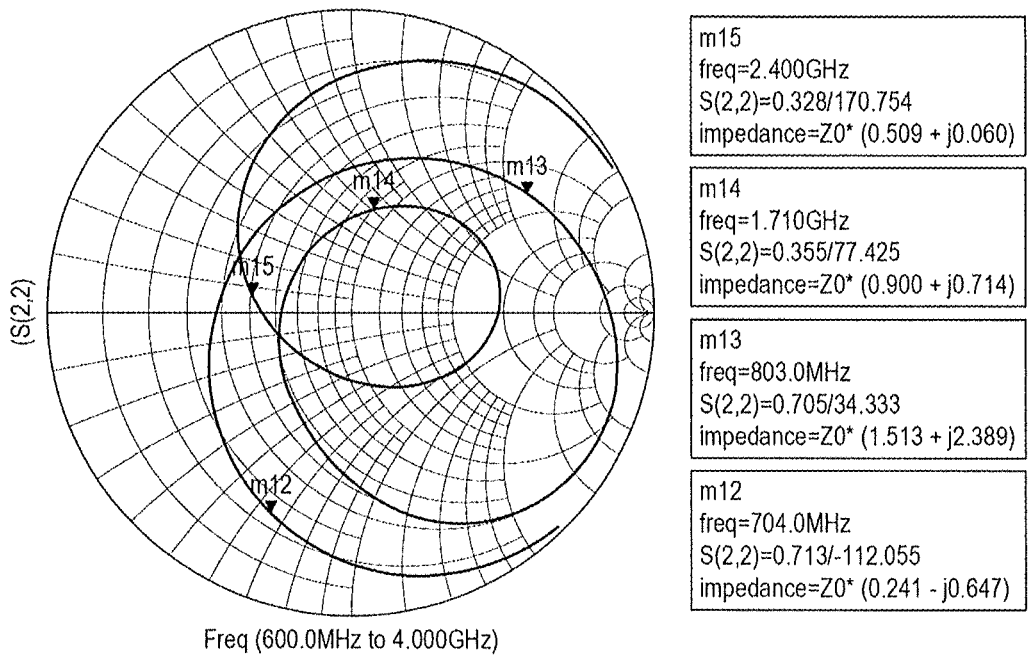

FIGS. 8A and 8B schematically show simulated antenna input impedance for an LTE antenna according to an example (e.g. the antenna 407 or 409 of FIG. 4)

Figure 9A:
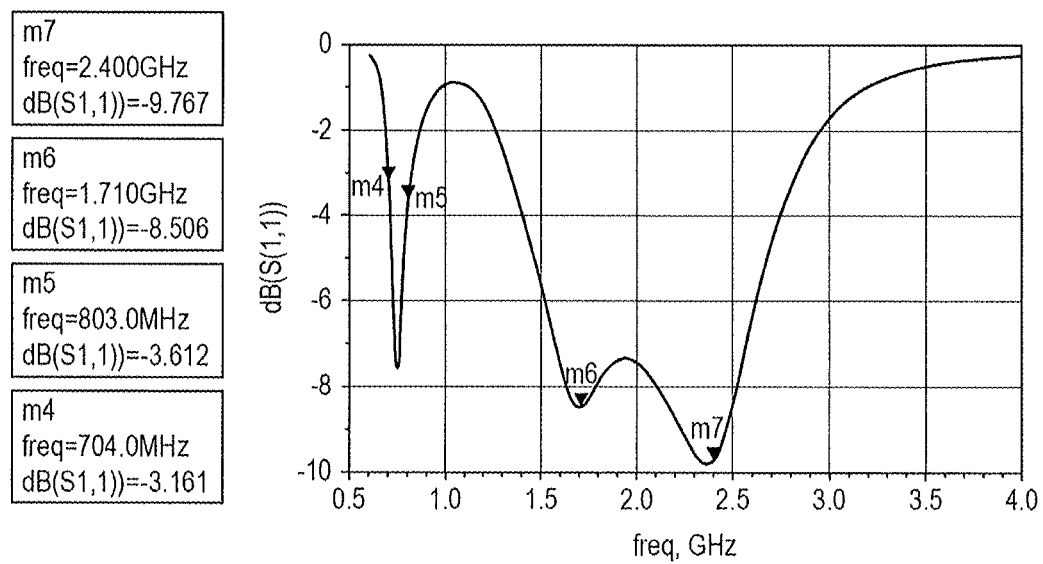
FIGS. 9A and 9B schematically show input impedance for an LTE antenna according to an example.
Figure 9B:
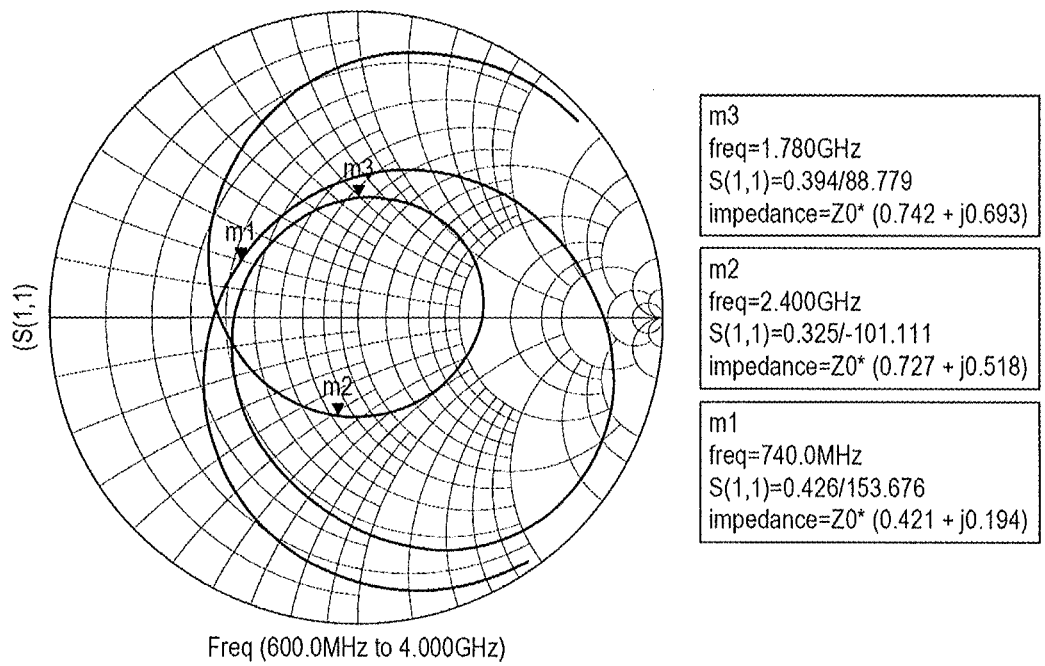

FIGS. 9A and 9B schematically show simulated antenna input impedance for an LTE antenna according to an example (e.g. the antenna 407 or 409 of FIG. 4).

Figure 10A:
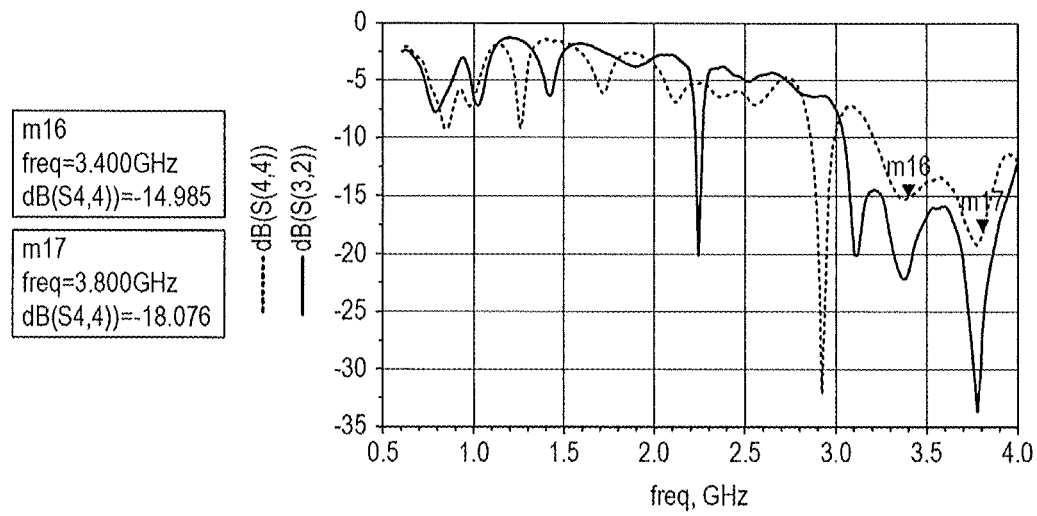
FIGS. 10A and 10B schematically show input impedance for a 5G antenna according to an example.
Figure 10B:
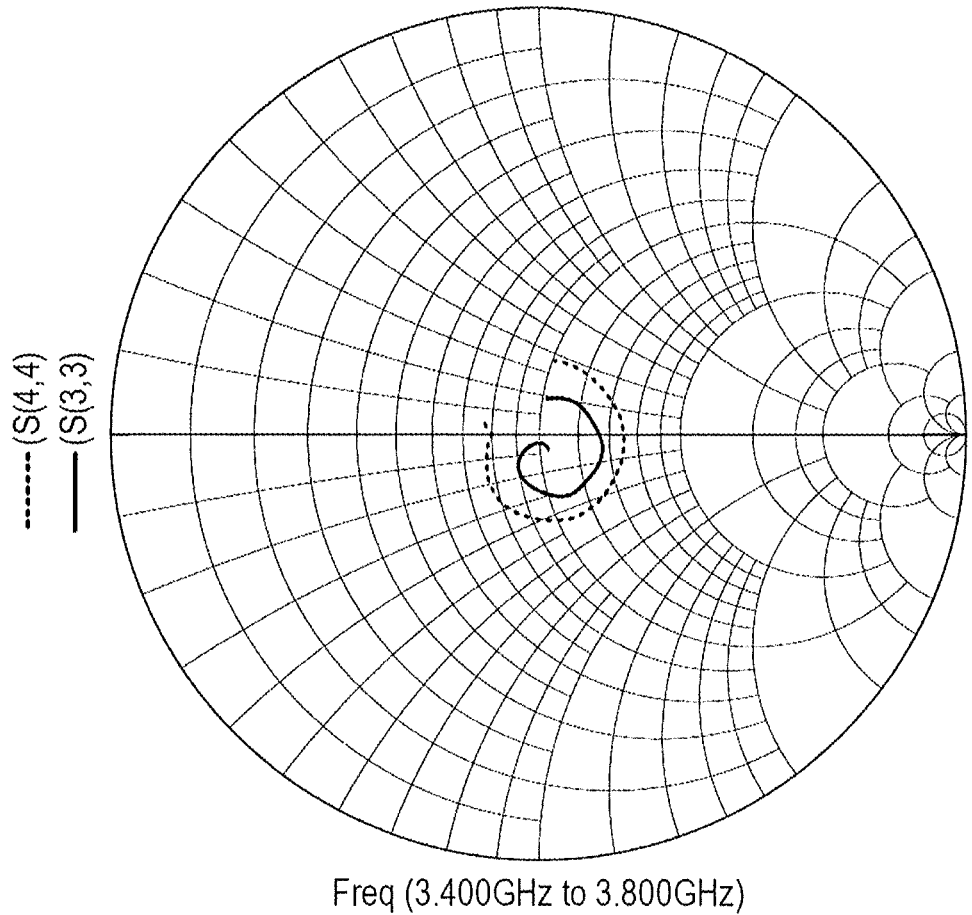

FIGS. 10A and 10B schematically show input impedance for a 5G antenna according to an example (e.g. antenna 408 of FIG. 4).

Figure 11:
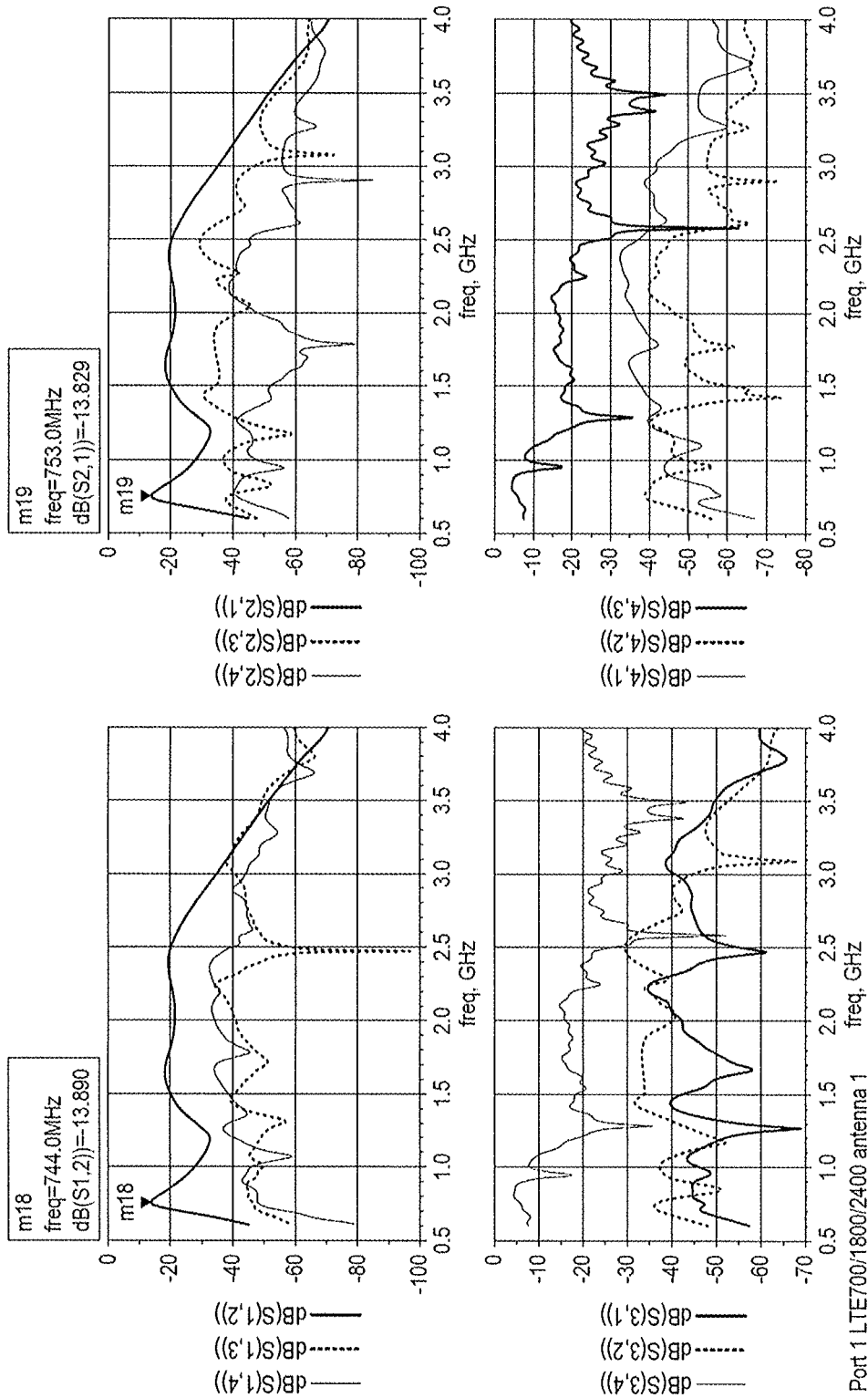
FIG. 11 schematically shows simulated mutual couplings between antennas according to an example.

FIG. 11 schematically shows simulated mutual couplings between antennas according to an example.

Figure 12A:
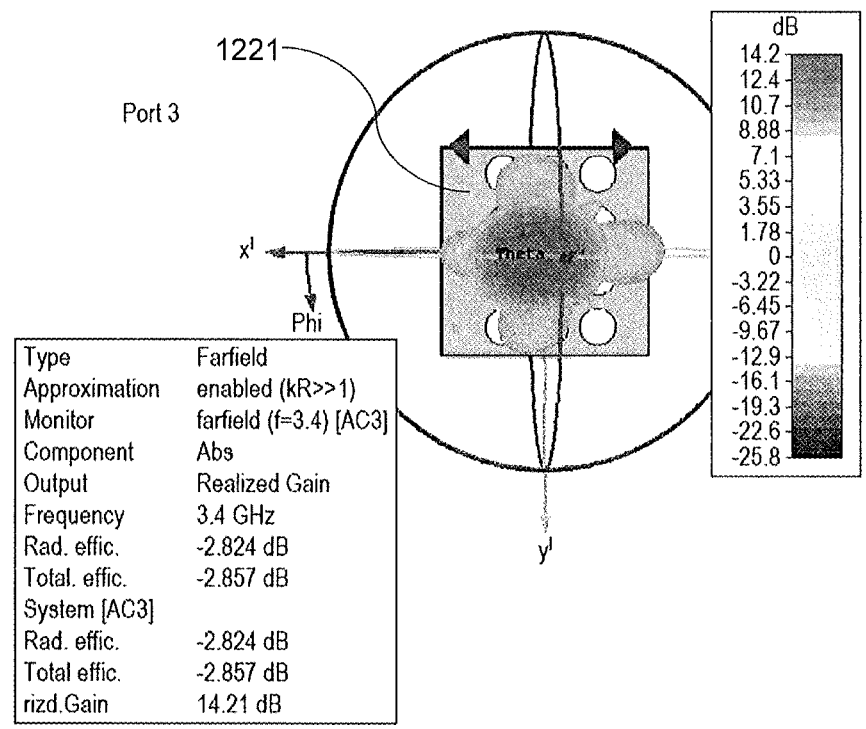
FIGS. 12A to 12F show simulated radio patterns for both input ports of a 5G antenna according to an example FIGS. 13A to 13C schematically show simulated radiation patterns for one of the LTE antennas.
Figure 12B:
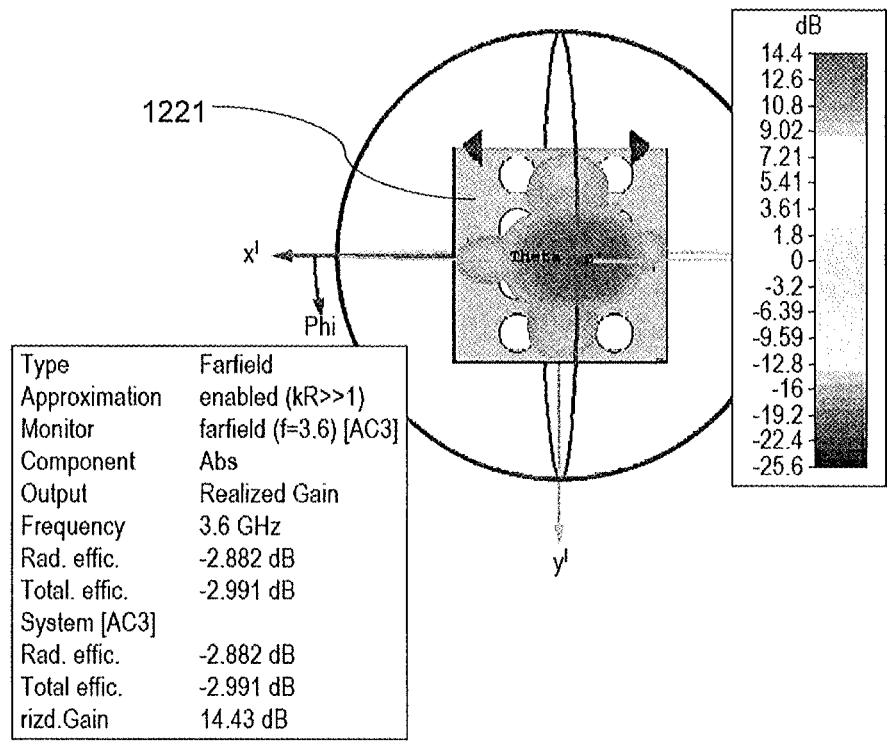
Figure 12C:
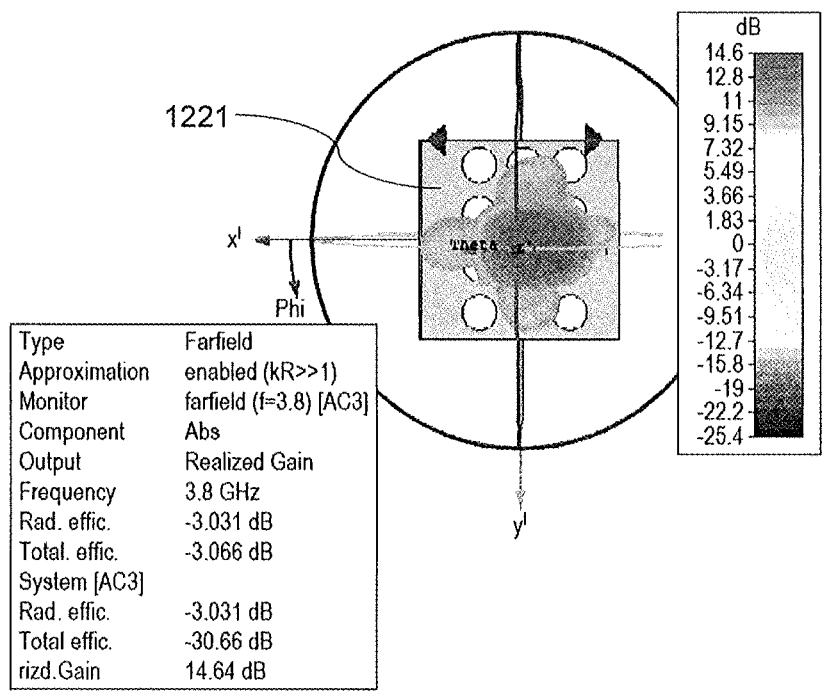
Figure 12D:
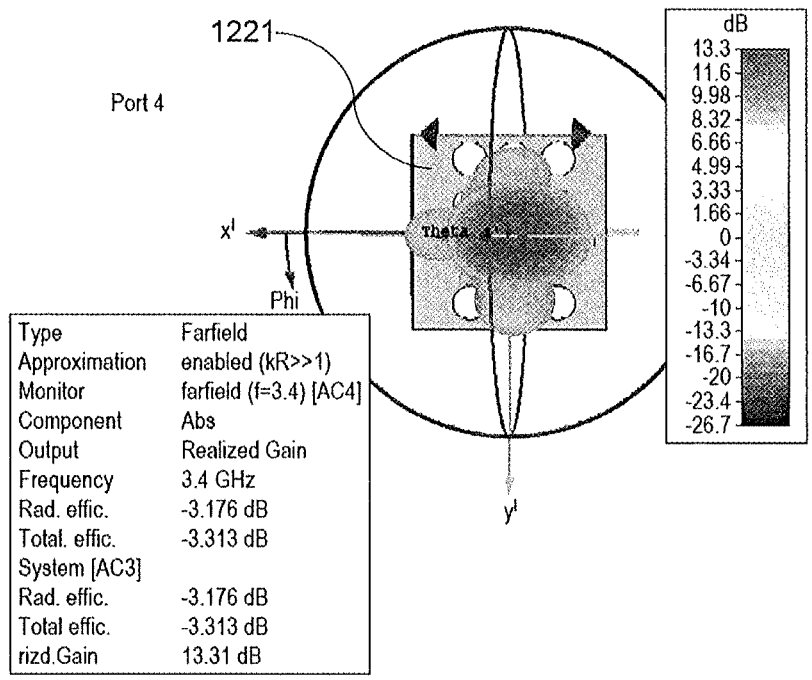
Figure 12E:
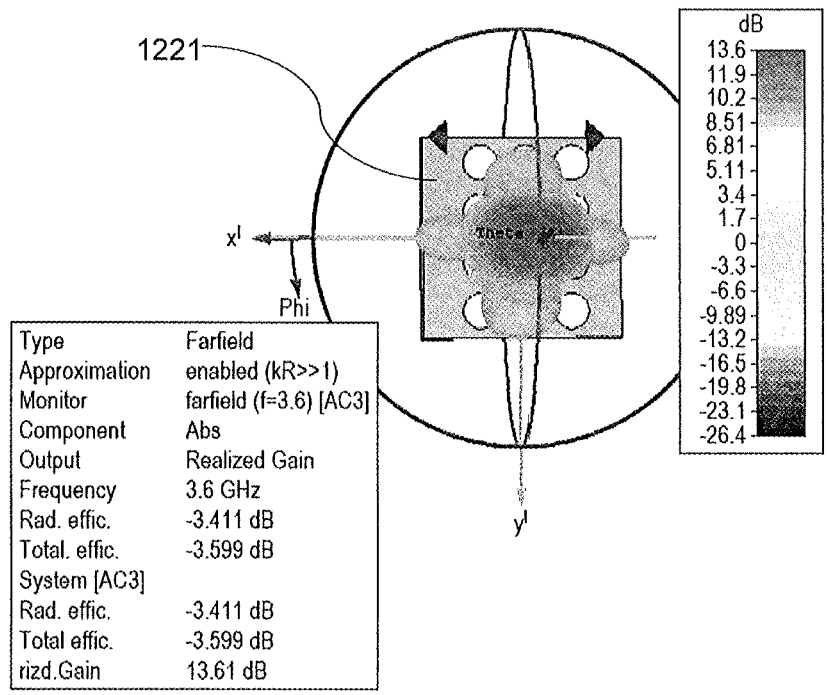
Figure 12F:
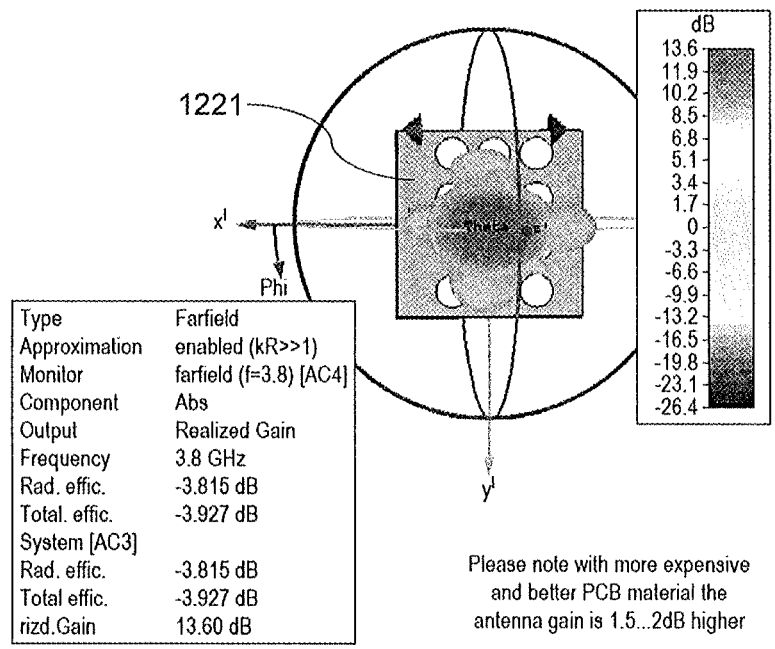

FIGS. 12A to 12F show simulated radio patterns for both input ports of a 5G antenna according to an example. FIGS. 12A to 12C relate to a first 5G port, and FIGS. 12D to 12F relate to a second input port. Antenna board 1221 is schematically shown in these Figures.

Figure 13A:
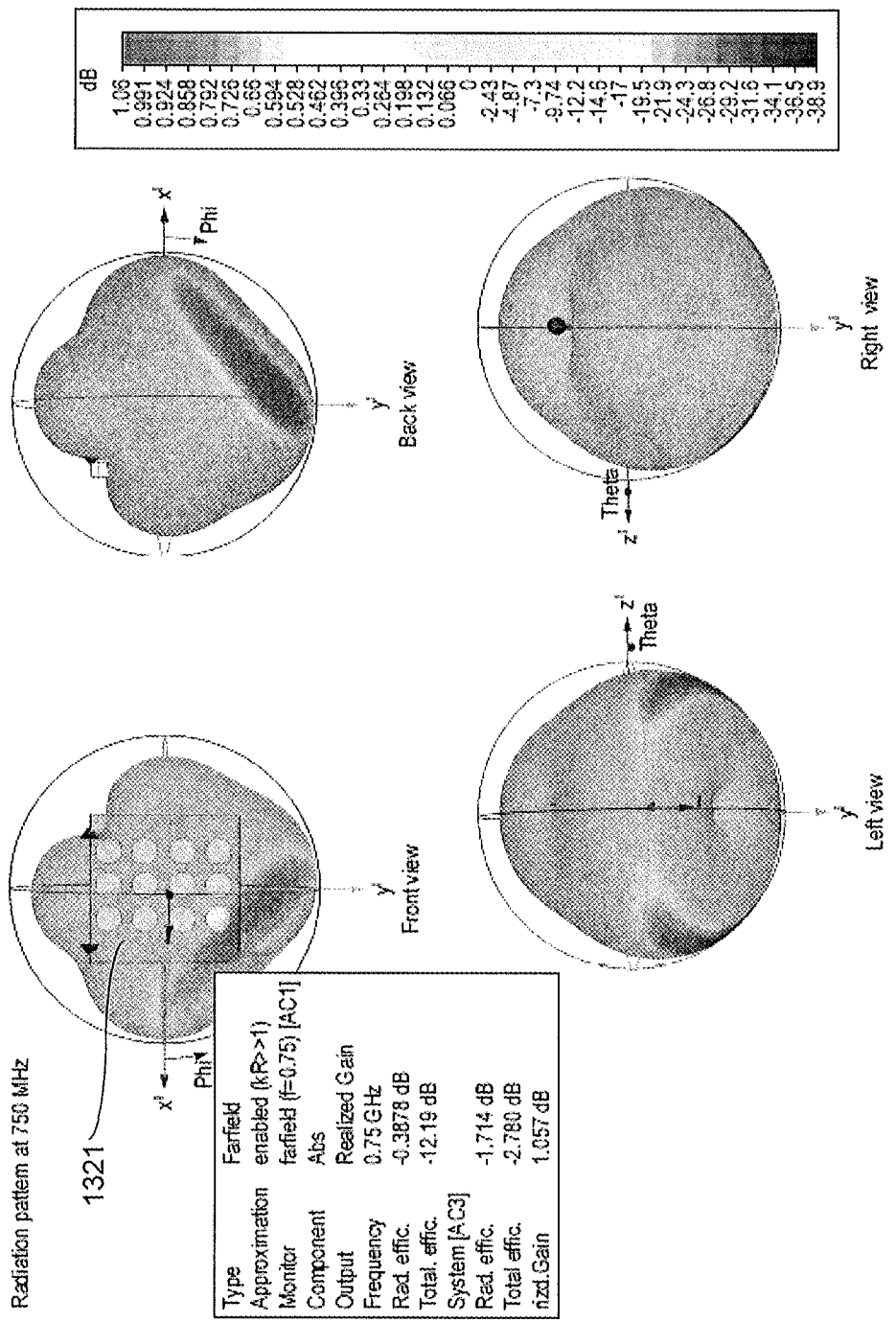
Figure 13B:
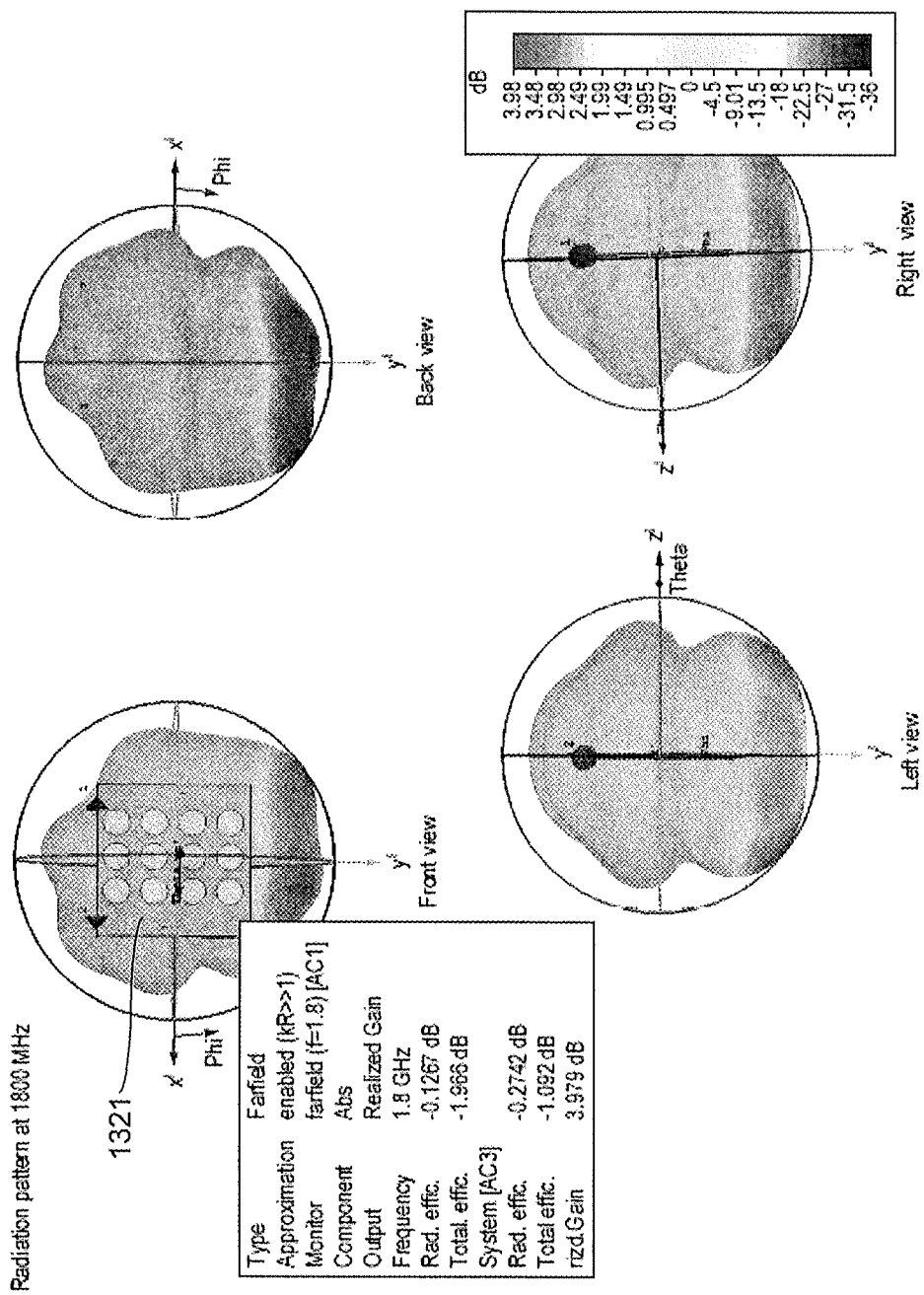
Figure 13C:
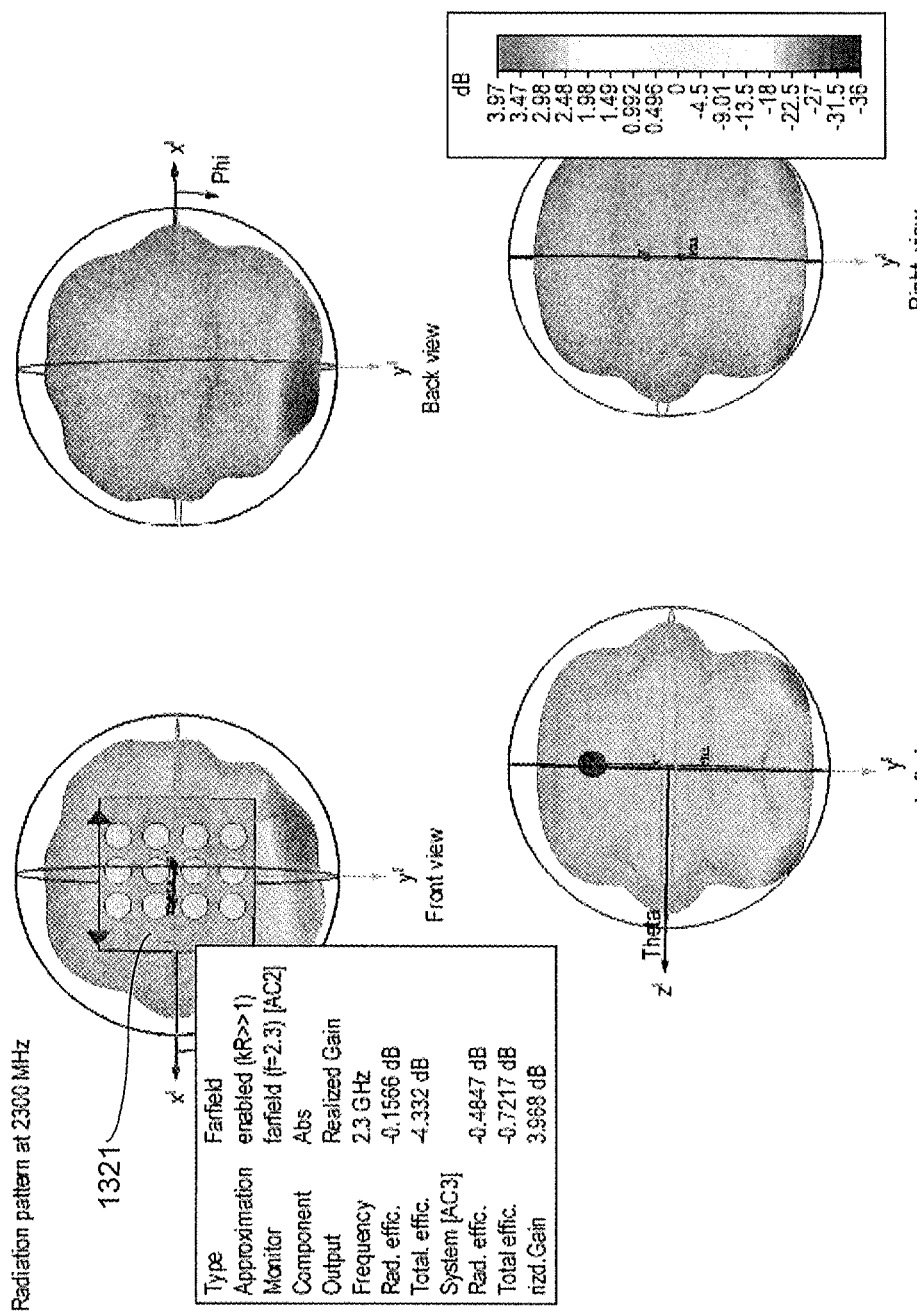

FIGS. 13A to 13C schematically show simulated radiation patterns for one of the LTE antennas. Antenna board is schematically shown at 1321.

Figure 14:
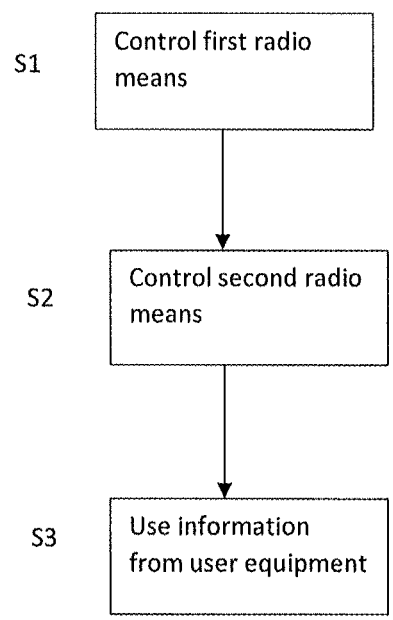
FIG. 14 is a flow chart schematically showing a method according to an example.

FIG. 14 is a flow chart schematically showing a method according to an example.

At S1, the method comprises controlling first radio means of an apparatus, the first radio means of the apparatus for communicating with first radio means of a base station.

At S2, the method comprises controlling second radio means of an apparatus, the second radio means of the apparatus for communicating with second radio means of a base station.

At S3, the method comprises using information received from a user equipment for configuring the second radio means of the apparatus such that a connection can be established between the second radio means of the apparatus and the second radio means of a base station.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
 a housing;
 control circuitry within the housing;
 first radio circuitry within the housing configured to communicate with first radio circuitry of a base station via a first radio link, wherein the first radio link is a 4G link and is configured to communicate control plane signaling;
 second radio circuitry within the housing configured to communicate with second radio circuitry of a base station via a second radio link, wherein the second radio link is a 5G link and is configured to communicate user plane signaling and/or data;
 wherein the control circuitry is configured to use information received from a user equipment, to configure the second radio circuitry of the apparatus such that a connection can be established between the second radio circuitry of the apparatus and the second radio circuitry of a base station.

2. The apparatus according to claim 1, the information received from the user equipment comprising information indicative of at least one of: location; orientation; position of the second radio circuitry of the apparatus.

3. The apparatus according to claim 1, the control circuitry configured to configure the second radio circuitry of the apparatus by causing alignment of an antenna beam of the second radio circuitry with an antenna beam of the second radio circuitry of a base station.

4. The apparatus according to claim 1, the control circuitry configured to configure the first radio circuitry of the apparatus such that a connection can be established between the first radio circuitry of the apparatus and the first radio circuitry of a base station, without using the information received from the user equipment.

5. The apparatus according to claim 1, the first radio circuitry of the apparatus comprising an omni-directional antenna.

6. The apparatus according to claim 1, the first radio circuitry of the apparatus comprising a monopole antenna.

7. The apparatus according to claim 1, the second radio circuitry of the apparatus comprising a directional antenna.

8. The apparatus according to claim 1, the first radio circuitry of the apparatus configured to communicate with the first radio circuitry of a base station using a first frequency band; and the second radio circuitry of the apparatus configured to communicate with the second radio circuitry of a base station using a second frequency band.

9. The apparatus according to claim 8, the first frequency band comprising a 4G frequency band and the second frequency band comprising a 5G frequency band.

10. The apparatus of claim 1, wherein the first radio circuitry of the apparatus is configured to communicate with the first radio circuitry of a base station using the first radio link while the second radio circuitry of the apparatus is configured to communicate with the second radio circuitry of a base station using the second radio link.

11. The apparatus of claim 1, where the apparatus is a customer premises equipment.

12. The apparatus of claim 1, where:
the control plane signaling between the first radio circuitry of the apparatus and the first radio circuitry of the base station is used for one or more of: subscription identification, device identification, cell selection, or device to cell registration; and
the user plane signaling between the second radio circuitry of the apparatus and the second radio circuitry of the base station is used for communicating data.

13. A method comprising:
controlling first radio circuitry within a housing of an apparatus, the first radio circuitry of the apparatus configured to communicate with first radio circuitry of a base station via a first radio link, wherein the first radio link is a 4G link and is configured to communicate control plane signaling;
controlling second radio circuitry within the housing of the apparatus, the second radio circuitry of the apparatus configured to communicate with second radio circuitry of a base station via a second radio link, wherein the second radio link is a 5G link and is configured to communicate user plane signaling and/or data;
wherein the controlling second radio circuitry of the apparatus comprises using information received from a user equipment to configure the second radio circuitry of the apparatus such that a connection can be established between the second radio circuitry of the apparatus and the second radio circuitry of a base station.

14. The method according to claim 13, the information received from the user equipment comprising information indicative of at least one of: location; orientation; position of the second radio circuitry of the apparatus.

15. The method according to claim 13, the configuring the second radio circuitry of the apparatus comprising causing alignment of an antenna beam of the second radio circuitry of the apparatus with an antenna beam of the second radio circuitry of a base station.

16. The method according to claim 13, the controlling the first radio circuitry of the apparatus comprising configuring the first radio circuitry of the apparatus such that a connection can be established between the first radio circuitry of the apparatus and the first radio circuitry of a base station, without using the information received from the user equipment.

17. The method according to claim 13, the first radio circuitry of the apparatus configured to communicate with the first radio circuitry of a base station using a first frequency band; and the second radio circuitry of the apparatus configured to communicate with the second radio circuitry of a base station using a second frequency band, the first frequency band comprising a 4G frequency band and the second frequency band comprising a 5G frequency band.

18. The method of claim 13, wherein the first radio circuitry of the apparatus is configured to communicate with the first radio circuitry of a base station using the first radio link while the second radio circuitry of the apparatus is configured to communicate with the second radio circuitry of a base station using the second radio link.

19. A non-transitory computer readable medium comprising instructions which, when the program is executed by a computer cause an apparatus to perform at least the following:
controlling first radio circuitry within a housing of the apparatus, the first radio circuitry of the apparatus configured to communicate with first radio circuitry of a base station via a first radio link, wherein the first radio link is a 4G link and is configured to communicate control plane signaling;
controlling second radio circuitry within the housing of the apparatus, the second radio circuitry of the apparatus configured to communicate with second radio circuitry of a base station via a second radio link, wherein the second radio link is a 5G link and is configured to communicate user plane signaling and/or data;
wherein the controlling second radio circuitry of the apparatus comprises using information received from a user equipment to configure the second radio circuitry of the apparatus such that a connection can be established between the second radio circuitry of the apparatus and the second radio circuitry of the base station.

20. The non-transitory computer readable medium of claim 19, wherein the first radio circuitry of the apparatus is configured to communicate with the first radio circuitry of a base station using the first radio link while the second radio circuitry of the apparatus is configured to communicate with the second radio circuitry of a base station using the second radio link.

* * * * *